US011554521B2

(12) United States Patent
Karau

(10) Patent No.: US 11,554,521 B2
(45) **Date of Patent: *Jan. 17, 2023**

(54) ADJUSTABLE LOCATOR RETAINING WALL BLOCK AND MOLD APPARATUS

(71) Applicant: PAVESTONE, LLC, Atlanta, GA (US)

(72) Inventor: William H. Karau, Southlake, TX (US)

(73) Assignee: PAVESTONE, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,285

(22) Filed: Jan. 25, 2021

(65) Prior Publication Data

US 2021/0138695 A1 May 13, 2021

Related U.S. Application Data

(63) Continuation of application No. 16/693,994, filed on Nov. 25, 2019, now Pat. No. 10,899,049, which is a (Continued)

(51) Int. Cl.

| | |
|---|---|
| ***E02D 29/02*** | (2006.01) |
| ***B29C 41/36*** | (2006.01) |
| ***B28B 7/00*** | (2006.01) |
| ***B28B 7/18*** | (2006.01) |
| ***E04B 2/32*** | (2006.01) |

(Continued)

(52) U.S. Cl.

CPC ................ *B29C 41/36* (2013.01); *B28B 7/00* (2013.01); *B28B 7/0097* (2013.01); *B28B 7/183* (2013.01); *E02D 29/02* (2013.01); *E02D 29/025* (2013.01); *E02D 29/0266* (2013.01); *E04B 2/32* (2013.01); *E04C 1/00* (2013.01); *E04C 1/395* (2013.01);
(Continued)

(58) Field of Classification Search

CPC ... E02D 29/025; E02D 29/0266; E02D 29/02; E04C 1/00; E04C 1/395; B29C 41/36; E04B 2/32; E04B 2002/0208; E04B 2002/0269; B28B 7/183; B28B 7/0097; B28B 7/00

See application file for complete search history.

(56) References Cited

U.S. PATENT DOCUMENTS 149,658 A 4/1874 Ingalls
191,273 A 5/1877 Walters
(Continued)

FOREIGN PATENT DOCUMENTS

CN 201620509 11/2010
GB 924290 4/1963
(Continued)

OTHER PUBLICATIONS

The Office Action issued by the Canadian Intellectual Property Office dated Jun. 16, 2016 for corresponding Canadian Patent Application No. 2,855,102, 4 pages.
(Continued)

*Primary Examiner* — Patrick J Maestri
(74) *Attorney, Agent, or Firm* — Jackson Walker LLP; Christopher J. Rourk

(57) ABSTRACT

A system of retaining wall blocks, a method of assembling a retaining wall block assembly, and a mold for manufacturing retaining wall blocks having adjustable engagement configurations.

20 Claims, 10 Drawing Sheets

Related U.S. Application Data continuation of application No. 15/994,313, filed on May 31, 2018, now Pat. No. 10,486,344, which is a continuation of application No. 15/688,784, filed on Aug. 28, 2017, now Pat. No. 9,999,993, which is a continuation of application No. 15/074,830, filed on Mar. 18, 2016, now Pat. No. 9,744,697, which is a continuation of application No. 14/311,194, filed on Jun. 20, 2014, now abandoned.

(60) Provisional application No. 61/838,205, filed on Jun. 21, 2013.

(51) Int. Cl.
*E04C 1/39* (2006.01)
*E04C 1/00* (2006.01)
*E04B 2/02* (2006.01)

(52) U.S. Cl.
CPC ................. *E04B 2002/0208* (2013.01); *E04B 2002/0269* (2013.01)

(56) References Cited

U.S. PATENT DOCUMENTS 195,286 A 9/1877 Ingalls
310,662 A 1/1885 Freeman
345,726 A 7/1886 Promoli
415,773 A 11/1889 Fiske
470,788 A 3/1892 Devine
511,098 A 12/1893 Shultz
534,462 A 2/1895 Baisley
584,269 A 6/1897 Northcutt
787,199 A 4/1905 Lloyd
803,014 A 10/1905 McIlravy
806,951 A 12/1905 Bryning
836,017 A 11/1906 Douglass
926,767 A 7/1909 Rehaut
1,032,858 A 7/1912 Pettit
1,085,975 A 2/1914 Aaronson
1,086,975 A 2/1914 Aaronson
1,092,621 A 4/1914 Womer
1,272,533 A 7/1918 Robinson
1,287,055 A 12/1918 Lehman
1,451,340 A 4/1923 Kroonen
1,534,353 A 4/1925 Besser
1,538,200 A 5/1925 Melton
1,572,887 A 2/1926 Dale
1,758,903 A 5/1930 Willetts .................... E04B 2/08 52/591.2
1,872,522 A 8/1932 Stuckey
1,893,430 A 1/1933 McKenzie
2,151,468 A 3/1939 Henderson
2,203,935 A 6/1940 Hedlund
2,219,606 A 10/1940 Schoick
2,313,363 A 3/1943 Schmitt
2,319,154 A 5/1943 Orlow
2,593,606 A 4/1952 Price
2,657,681 A 11/1953 Gatzke
2,745,276 A 5/1956 Kuhlman
2,746,447 A 5/1956 Petch
2,775,326 A 12/1956 Blum
2,867,205 A 1/1959 Vesper
2,881,753 A 4/1959 Entz
2,925,080 A 2/1960 Smith
3,095,868 A 7/1963 Mangis
3,120,842 A 2/1964 Cox et al.
3,392,719 A 7/1968 Clanton et al.
3,425,105 A 2/1969 Guide
3,464,328 A 9/1969 Van Der Meijden
3,492,984 A 2/1970 Harper
3,559,631 A 2/1971 Mangis
3,677,258 A 7/1972 Fletcher et al.
3,809,049 A 5/1974 Fletcher et al.
3,810,726 A 5/1974 Bjorhaag
3,923,410 A 12/1975 Jordan et al.
3,940,229 A 2/1976 Hutton
3,981,953 A 9/1976 Haines
4,023,767 A 5/1977 Fontana
4,050,864 A 9/1977 Komaki
4,098,865 A 7/1978 Repasky
4,114,773 A 9/1978 Sekiguchi
4,139,593 A 2/1979 Holz et al.
4,178,340 A 12/1979 Hyytinen
4,185,939 A 1/1980 Barth et al.
4,193,718 A 3/1980 Wahrendorf et al.
4,250,863 A 2/1981 Gagnon et al.
4,301,637 A 11/1981 Anderson
4,335,549 A 6/1982 Dean, Jr.
4,391,312 A 7/1983 Sakraida, Jr.
4,426,815 A 1/1984 Brown
4,429,506 A 2/1984 Henderson
4,524,551 A 6/1985 Scheiwiller
4,599,929 A 7/1986 Dutina
4,627,764 A 12/1986 Scheiwiller
4,770,218 A 9/1988 Duerr
4,782,866 A 11/1988 Valdez
4,784,821 A 11/1988 Leopold
D299,067 S 12/1988 Forsberg
4,802,320 A 2/1989 Forsberg ............... E02D 29/025 52/585.1
4,802,836 A 2/1989 Whissell
4,834,155 A 5/1989 Vuollet
4,840,825 A 6/1989 Aristodimou
4,848,309 A 7/1989 Alderete
4,869,660 A 9/1989 Ruckstuhl
4,936,712 A 6/1990 Glickman ............. E02D 29/025 405/284
4,973,192 A 11/1990 Hair
D315,026 S 2/1991 Castonguay et al.
5,017,049 A 5/1991 Sievert
5,028,172 A 7/1991 Wilson et al.
5,031,376 A 7/1991 Bender et al.
5,056,998 A 10/1991 Goossens
5,062,610 A 11/1991 Woolford et al.
5,066,070 A 11/1991 Clarke
5,078,940 A 1/1992 Sayles
5,107,911 A 4/1992 Plakotaris
5,139,006 A 8/1992 Trudeau
5,152,275 A 10/1992 Landhuis
5,158,132 A 10/1992 Guillemot
5,201,843 A 4/1993 Hair
5,217,630 A 6/1993 Sayles
5,286,139 A 2/1994 Hair
5,294,216 A 3/1994 Sievert
5,342,142 A 8/1994 Barth et al.
D350,610 S 9/1994 Rodrigue
5,360,285 A 11/1994 Barth et al.
5,413,086 A 5/1995 Trudeau
5,429,451 A 7/1995 Pettee, Jr.
5,441,092 A 8/1995 Randle
5,465,542 A 11/1995 Terry
5,487,526 A 1/1996 Hupp
5,503,498 A 4/1996 Scheiwiller
5,534,214 A 7/1996 Sakamoto et al.
5,589,124 A 12/1996 Woolford et al.
D377,181 S 1/1997 Hupp
D378,702 S 4/1997 Blomquist et al.
5,662,094 A 9/1997 Giacomelli
5,662,386 A 9/1997 Newman et al.
5,687,515 A 11/1997 Rodrigues et al.
5,704,183 A 1/1998 Woolford
5,709,062 A 1/1998 Woolford
5,709,602 A 1/1998 Woolford
5,711,129 A 1/1998 Woolford
5,722,386 A 3/1998 Fladgard et al.
5,733,470 A 3/1998 Roth et al.
5,735,643 A 4/1998 Castonguay et al.
5,762,061 A 6/1998 Bevan
5,775,838 A 7/1998 Pettee, Sr.
5,788,423 A 8/1998 Perkins
5,791,389 A 8/1998 Valdez
5,795,105 A 8/1998 Guth

(56) References Cited

U.S. PATENT DOCUMENTS

| | | | |
|---|---|---|---|
| D397,802 | S | 9/1998 | Terry |
| 5,816,749 | A | 10/1998 | Bailey, II ............ E02D 29/0241 405/284 |
| 5,827,015 | A | 10/1998 | Woolford et al. |
| D404,146 | S | 1/1999 | Perkins |
| 5,878,545 | A | 3/1999 | Gebhart |
| 5,879,603 | A | 3/1999 | Sievert |
| 5,884,445 | A | 3/1999 | Woolford |
| 5,894,702 | A | 4/1999 | Stenekes ................... E04B 2/46 52/592.1 |
| 5,901,520 | A | 5/1999 | Abdul-Baki |
| 5,902,069 | A | 5/1999 | Barth et al. |
| D411,315 | S | 6/1999 | Bott |
| 5,921,715 | A | 7/1999 | Rainey |
| 5,960,604 | A | 10/1999 | Blanton |
| D416,627 | S | 11/1999 | McAllister |
| 6,010,279 | A | 1/2000 | Taylor-Smith |
| 6,018,922 | A | 2/2000 | McKinnon |
| 6,029,943 | A | 2/2000 | Sievert |
| 6,050,255 | A | 4/2000 | Sievert |
| D428,499 | S | 7/2000 | Bazzocchi |
| 6,082,057 | A | 7/2000 | Sievert |
| 6,102,026 | A | 8/2000 | Fladgard et al. |
| D431,305 | S | 9/2000 | Barth et al. |
| 6,113,318 | A | 9/2000 | Guth |
| 6,113,379 | A | 9/2000 | LaCroix et al. |
| 6,134,853 | A | 10/2000 | Haener |
| 6,138,983 | A | 10/2000 | Sievert |
| 6,142,713 | A | 11/2000 | Woolford et al. |
| 6,149,352 | A | 11/2000 | MacDonald |
| D435,304 | S | 12/2000 | Rainey |
| 6,168,351 | B1 | 1/2001 | Rainey et al. |
| 6,178,704 | B1 | 1/2001 | Sievert |
| D437,422 | S | 2/2001 | Bolles et al. |
| 6,183,168 | B1 | 2/2001 | Woolford et al. |
| D438,640 | S | 3/2001 | Bolles |
| 6,199,545 | B1 | 3/2001 | Adamson |
| 6,209,848 | B1 | 4/2001 | Bolles et al. |
| D442,703 | S | 5/2001 | Fifield |
| 6,224,815 | B1 | 5/2001 | LaCroix et al. |
| D445,512 | S | 7/2001 | Sievert |
| 6,253,519 | B1 | 7/2001 | Daniel ...................... E04B 2/44 52/591.1 |
| 6,260,326 | B1 | 7/2001 | Muller-Hartburg |
| 6,263,633 | B1 | 7/2001 | Hagenah |
| D448,861 | S | 10/2001 | Daniels et al. |
| 6,309,716 | B1 | 10/2001 | Fisher et al. |
| 6,312,197 | B1 | 11/2001 | Woolford et al. |
| 6,318,934 | B1 | 11/2001 | Borgersen et al. |
| 6,321,740 | B1 | 11/2001 | Scherer et al. |
| 6,322,291 | B1 | 11/2001 | Rainey |
| 6,338,597 | B1 | 1/2002 | Rainey |
| D458,693 | S | 6/2002 | Sievert |
| D464,145 | S | 10/2002 | Scherer |
| 6,460,534 | B1 | 10/2002 | Vasquez et al. |
| 6,464,199 | B1 | 10/2002 | Johnson |
| 6,488,448 | B1 | 12/2002 | Blomquist et al. ........... 405/284 |
| 6,490,837 | B1 | 12/2002 | Dueck et al. |
| 6,502,569 | B1 | 1/2003 | Lee |
| 6,588,168 | B2 | 7/2003 | Walters |
| 6,591,547 | B1 | 7/2003 | Staten et al. |
| 6,609,545 | B1 | 8/2003 | Gelder |
| 6,609,695 | B2 | 8/2003 | LaCroix et al. |
| D479,341 | S | 9/2003 | Scullion ....................... D25/113 |
| 6,612,784 | B2 | 9/2003 | Rainey et al. |
| 6,616,382 | B2 | 9/2003 | Woolford et al. |
| D482,133 | S | 11/2003 | Scherer et al. |
| 6,652,196 | B1 | 11/2003 | Rainey |
| 6,665,994 | B1 | 12/2003 | Ruggeri |
| 6,668,816 | B1 | 12/2003 | Pedersen et al. |
| 6,679,021 | B2 | 1/2004 | Maimon et al. |
| 6,705,190 | B2 | 3/2004 | Newnes et al. |
| 6,758,636 | B2 | 7/2004 | Rainey et al. |
| 6,854,220 | B2 | 2/2005 | Dueck et al. |
| 6,857,244 | B2 | 2/2005 | Schmitz |
| 6,862,856 | B2 | 3/2005 | Turgeon-Schramm et al. |
| 6,863,469 | B2 | 3/2005 | Bolduc et al. |
| 6,874,494 | B2 | 4/2005 | Scherer et al. |
| D505,733 | S | 5/2005 | Castonguay et al. |
| 6,886,551 | B2 | 5/2005 | Scherer et al. |
| D506,837 | S | 6/2005 | Scherer et al. |
| 6,910,474 | B1 | 6/2005 | Scherer |
| 6,910,796 | B2 | 6/2005 | Bailey et al. |
| 6,918,715 | B2 | 7/2005 | Scherer et al. |
| 6,921,231 | B2 | 7/2005 | Rainey et al. |
| 6,923,565 | B2 | 8/2005 | Johnson |
| 6,935,812 | B2 | 8/2005 | Rainey |
| 6,953,309 | B1 | 10/2005 | Tufts et al. |
| D511,578 | S | 11/2005 | Mugge et al. |
| 6,962,028 | B2 | 11/2005 | Banova |
| 6,964,272 | B2 | 11/2005 | Scherer |
| D513,805 | S | 1/2006 | Scherer et al. |
| 6,988,847 | B2 | 1/2006 | Lazar |
| 6,994,495 | B1 | 2/2006 | Carey ................... E02D 29/025 405/284 |
| 7,004,158 | B2 | 2/2006 | Scherer et al. |
| D518,578 | S | 4/2006 | Mugge et al. |
| 7,037,047 | B1 | 5/2006 | Tufts et al. |
| 7,055,517 | B1 | 6/2006 | Kitahara |
| 7,066,167 | B2 | 6/2006 | Scherer et al. |
| 7,077,121 | B1 | 7/2006 | Havill |
| D529,195 | S | 9/2006 | Mugge |
| 7,104,295 | B2 | 9/2006 | Heikkinen et al. |
| D529,628 | S | 10/2006 | Mugge et al. |
| D530,831 | S | 10/2006 | Mugge et al. |
| D532,910 | S | 11/2006 | Mugge et al. |
| 7,140,867 | B2 | 11/2006 | Scherer et al. |
| 7,146,974 | B2 | 12/2006 | Scherer |
| D538,946 | S | 3/2007 | Mugge et al. |
| 7,185,470 | B1 * | 3/2007 | Link ....................... E04C 1/395 52/603 |
| 7,197,855 | B2 | 4/2007 | Della Pepa |
| 7,207,146 | B1 | 4/2007 | Morrell ................. B28B 7/0044 405/284 |
| 7,208,112 | B2 | 4/2007 | Scherer |
| D541,950 | S | 5/2007 | Mugge et al. |
| D541,951 | S | 5/2007 | Mugge et al. |
| 7,220,078 | B2 | 5/2007 | Drost et al. |
| 7,252,081 | B2 | 8/2007 | Havill |
| RE39,922 | E | 11/2007 | Rainey |
| D563,566 | S | 3/2008 | Aoki et al. |
| 7,360,970 | B2 | 4/2008 | Woolford et al. |
| 7,367,167 | B2 | 5/2008 | Takayanagi |
| 7,384,215 | B2 | 6/2008 | Woolford |
| D576,293 | S | 9/2008 | Mugge et al. |
| 7,425,106 | B2 | 9/2008 | Altmann et al. |
| 7,428,900 | B2 | 9/2008 | Scherer |
| D581,548 | S | 11/2008 | Mugge et al. |
| 7,458,800 | B2 | 12/2008 | Scherer et al. |
| D584,423 | S | 1/2009 | Mugge |
| 7,484,910 | B2 | 2/2009 | Mugge |
| D588,714 | S | 3/2009 | Mugge et al. |
| D596,318 | S | 7/2009 | Mugge et al. |
| D598,136 | S | 8/2009 | Mugge |
| D604,430 | S | 11/2009 | Mugge et al. |
| 7,637,688 | B2 | 12/2009 | Riccobene |
| D609,367 | S | 2/2010 | Mugge et al. |
| D611,164 | S | 3/2010 | Mugge |
| 7,674,420 | B2 | 3/2010 | Johnson et al. |
| 7,704,434 | B2 | 4/2010 | Johnson |
| 7,743,574 | B2 | 6/2010 | Tufts et al. |
| D619,734 | S | 7/2010 | Mugge et al. |
| D621,069 | S | 8/2010 | Mugge et al. |
| D621,960 | S | 8/2010 | Mugge et al. |
| 7,766,002 | B2 | 8/2010 | Karau |
| 7,775,747 | B2 | 8/2010 | Bott |
| D623,809 | S | 9/2010 | Nair |
| D623,810 | S | 9/2010 | Breit |
| D624,205 | S | 9/2010 | O'Connor |
| D625,840 | S | 10/2010 | Mugge |
| D625,842 | S | 10/2010 | Mugge et al. |
| 7,807,083 | B2 | 10/2010 | Scherer |
| 7,811,027 | B2 | 10/2010 | Scheiwiller |
| 7,849,656 | B2 | 12/2010 | Mugge et al. |

(56) References Cited

U.S. PATENT DOCUMENTS

| | | | | |
|---|---|---|---|---|
| 7,850,394 | B2 | 12/2010 | Schroder | |
| 7,860,763 | B1 | 12/2010 | Quinn et al. | |
| 7,862,763 | B2 | 1/2011 | Tufts et al. | |
| 7,870,853 | B2 | 1/2011 | Scherer | |
| D634,028 | S | 3/2011 | Mugge et al. | |
| 7,908,799 | B2 | 3/2011 | Mugge et al. | |
| D636,094 | S | 4/2011 | Mugge | |
| 7,930,865 | B2 | 4/2011 | Barlow | |
| D638,957 | S | 5/2011 | Mugge et al. | |
| 7,967,001 | B2 | 6/2011 | Scherer et al. | |
| 7,972,128 | B2 | 7/2011 | Mugge et al. | |
| 7,979,251 | B2 | 7/2011 | Jakobsen et al. | |
| 7,984,600 | B2 | 7/2011 | Alford et al. | |
| 7,984,800 | B2 | 7/2011 | Alford et al. | |
| D643,939 | S | 8/2011 | Mugge et al. | |
| D643,943 | S | 8/2011 | Mugge et al. | |
| 8,006,683 | B2 | 8/2011 | Scherer et al. | |
| D646,402 | S | 10/2011 | Mugge | |
| D650,094 | S | 12/2011 | Mugge et al. | |
| D653,772 | S | 2/2012 | Mugge et al. | |
| 8,128,851 | B2 | 3/2012 | Scherer | |
| D662,608 | S | 6/2012 | Mugge et al. | |
| D662,609 | S | 6/2012 | Mugge et al. | |
| 8,246,092 | B2 | 8/2012 | Tufts et al. | |
| 8,246,892 | B2 | 8/2012 | Tufts et al. | |
| 8,251,053 | B2 | 8/2012 | Scherer | |
| 8,256,182 | B2 | 9/2012 | Wolter et al. | |
| 8,313,267 | B2 | 11/2012 | Johnson et al. | |
| 8,327,833 | B2 | 12/2012 | Scherer et al. | |
| D673,693 | S | 1/2013 | Mugge et al. | |
| D677,801 | S | 3/2013 | Mugge et al. | |
| D677,802 | S | 3/2013 | Mugge et al. | |
| D687,167 | S | 7/2013 | Mugge et al. | |
| 8,524,138 | B2 | 9/2013 | Johnson | |
| 8,540,915 | B2 | 9/2013 | Scherer | |
| D690,835 | S | 10/2013 | Mugge et al. | |
| D690,836 | S | 10/2013 | Mugge et al. | |
| D693,481 | S | 11/2013 | Johnson et al. | |
| D694,431 | S | 11/2013 | Burnquist et al. | |
| 8,677,711 | B2 | 3/2014 | Wolter et al. | |
| D703,838 | S | 4/2014 | Mugge et al. | |
| D704,352 | S | 5/2014 | Johnson et al. | |
| D705,951 | S | 5/2014 | Mugge et al. | |
| 8,715,557 | B2 | 5/2014 | Johnson et al. | |
| D729,414 | S | 5/2015 | Johnson et al. | |
| 9,021,762 | B1 | 5/2015 | DePalma | E04B 2/14 52/596 |
| D836,017 | S | 12/2018 | Leal | |
| D926,767 | S | 8/2021 | Akana et al. | |
| 11,092,621 | B2 | 8/2021 | Womer | |
| 2002/0015620 | A1 | 2/2002 | Woolford et al. | |
| 2002/0038532 | A1 | 4/2002 | Huberty | |
| 2002/0092257 | A1 | 7/2002 | Scherer et al. | |
| 2003/0180099 | A1 | 9/2003 | Scherer et al. | |
| 2004/0067103 | A1 | 4/2004 | Hart | |
| 2005/0081470 | A1 | 4/2005 | Utsunomiya | |
| 2006/0054154 | A1 | 3/2006 | Scherer | |
| 2006/0059839 | A1 | 3/2006 | Azar | |
| 2006/0230701 | A1 | 10/2006 | Della Pepa | |
| 2008/0060300 | A1 | 3/2008 | Westmoreland et al. | |
| 2008/0092869 | A1 | 4/2008 | Karau | |
| 2008/0096471 | A1 | 4/2008 | Karau | |
| 2008/0098686 | A1 | 5/2008 | Metten | |
| 2008/0260474 | A1 | 10/2008 | Koster | E04C 1/395 405/284 |
| 2008/0276562 | A1 | 11/2008 | Stuchell | |
| 2009/0103987 | A1 | 4/2009 | MacDonald | |
| 2009/0188186 | A1 | 7/2009 | Fbanks | |
| 2009/0308015 | A1 | 12/2009 | MacDonald et al. | |
| 2009/0313933 | A1 | 12/2009 | Clear | |
| 2010/0043335 | A1 | 2/2010 | O'Connor | |
| 2011/0078978 | A1 | 4/2011 | Wauhop | 52/745.19 |
| 2011/0162314 | A1 | 7/2011 | Leach | E02D 29/025 52/609 |
| 2012/0057933 | A1 | 3/2012 | Gebhart | |

FOREIGN PATENT DOCUMENTS

| | | |
|---|---|---|
| GB | 948121 | 1/1964 |
| GB | 1509747 | 5/1978 |
| RU | 2011819 | 4/1994 |
| RU | 2198095 | 2/2003 |
| RU | 20198095 | 2/2003 |
| WO | 2008015407 | 2/2008 |
| WO | 2008033157 | 3/2008 |
| WO | 2010013991 | 2/2010 |

OTHER PUBLICATIONS

The Notice of Allowance issued by the Canadian Intellectual Property Office dated Jun. 23, 2016 for corresponding Canadian Patent Application No. 2,854,940, 1 page.

The Response to Jun. 16, 2016 Office Action filed Nov. 30, 2016 with the Canadian Intellectual Property Office for corresponding Canadian Patent Application No. 2,855,102, 14 pages.

"Haith Robot System for Aggregate Industries", http://www.hub-4.com/news/109/haith-robot-system-for-aggregate-industries, Jul. 31, 2006, 2 pages.

"Reconstituted Stone—Stone Pitchers", http://www.haithindustrial.eo.uk/index.php?sec=cont&id=26, Jul. 31, 2006, 1 page.

"Natural Stone—Block and Slab Splitting", http://www.haithindustrial.eo.uk/index.php?sec=cont&id=32, Jul. 31, 2006, 2 pages.

"Splitting, Cutting, Marking & Layout", http://www.pavetech.com/newtools/cutting.shtm, Jul. 31, 2006, 2 pages.

"Stone Splitter", http://www.pavetech.com/newtools/stonesplitter.shtm, Jul. 31, 2006, 2 pages.

"Splitters/Turnovers", http://www.besser.com/equipment/splitters/, Aug. 3, 2006, 2 pages.

"Split-Face Concrete Block", http://www.toolbase.org/Technology-Inventory/walls/split-face-concrete-block, Aug. 3, 2006, 4 pages.

Belgard—"Enhance Your Environment with Beljard—The Celtik Wall System Retaining Wall"; Mar. 1998, 9 pages.

The Response in response to Jun. 16, 2016 filed on Nov. 30, 2016 with the Canadian Patent Office for the pending Canadian patent application No. 2,855,102.

The Office Action issued by the Canadian Intellectual Property Office dated Jun. 16, 2016 for corresponding Canadian Patent Application No. 2,855,102.

The Notice of Allowance issued by the Canadian Intellectual Property Office dated Jun. 23, 2016 for corresponding Canadian Patent Application No. 2,854,940.

Kronimun; City Truck; Pflaster—und Plattensystem for hohere Aufgaben; 20 pages; Sep. 21, 2012.

Canadian Patent Office; Office Action; Canadian Serial No. 2,854,940; 4 page.

"Haith Robot System for Aggregate Industries," http://www.hub-4.com/news/109/haith-robot-system-for-aggregate-industries, Jul. 31, 2006.

"Reconstructed Stone—Stone Pitchers," http://www.haithindustrial.co.uk/index.php?sec=cont&id=26, Jul. 31, 2006.

"Natural Stone—Block and Slab Splitting," http://www.haithindustrial.co.uk/index.php?sec=cont&id=32, Jul. 31, 2006.

Splitting, Cutting, Marking & Layout, http://www.pavetech.com/newtools/cutting.shtm, Jul. 31, 2006.

"Stone Splitter," http://www.pavetech.com/newrols/stonesplitter.shtm, Jul. 31, 2006.

"Splitters/Turnovers," http://www.besser.com/equipment/splitters/, Aug. 3, 2006.

"Split-Face Concrete Block," http://www.toolbase.org/Technology-Inventory/walls/split-face-concrete-block, Aug. 3, 2006.

Belgard—Enhance Your Environment with Belgard, The Celtik Wall System Retaining Wall; March 1998.

* cited by examiner

400B

600

ADJUSTABLE LOCATOR RETAINING WALL BLOCK AND MOLD APPARATUS

RELATED APPLICATIONS

The present application is a continuation of U.S. patent application Ser. No. 16/693,994 filed Nov. 25, 2019, which is a continuation of U.S. patent application Ser. No. 15/994,313 filed May 31, 2018, which issued on Nov. 26, 2019 as U.S. Pat. No. 10,486,344, which is a continuation of U.S. patent application Ser. No. 15/688,784 filed Aug. 28, 2017, which issued on Jun. 19, 2018 as U.S. Pat. No. 9,999,993, which is a continuation of U.S. patent application Ser. No. 15/074,830 filed Mar. 18, 2016, which issued on Aug. 29, 2017 as U.S. Pat. No. 9,744,697, which is a continuation of U.S. patent application Ser. No. 14/311,194, filed Jun. 20, 2014, which claims priority to and benefit of U.S. Provisional Patent Application No. 61/838,205, filed Jun. 21, 2013, which are hereby incorporated by reference for all purposes as if set forth herein in their entireties.

TECHNICAL FIELD

The present disclosure relates to retaining wall blocks, and more specifically to a retaining wall having adjustable positioning engagements and a mold for manufacturing such.

BACKGROUND OF THE INVENTION

Retaining wall blocks can be manufactured and arranged in a variety of different ways.

SUMMARY OF THE INVENTION

A system of retaining wall blocks, a method of assembling a retaining wall block assembly, and a mold for manufacturing retaining wall blocks having adjustable engagement configurations.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1A:
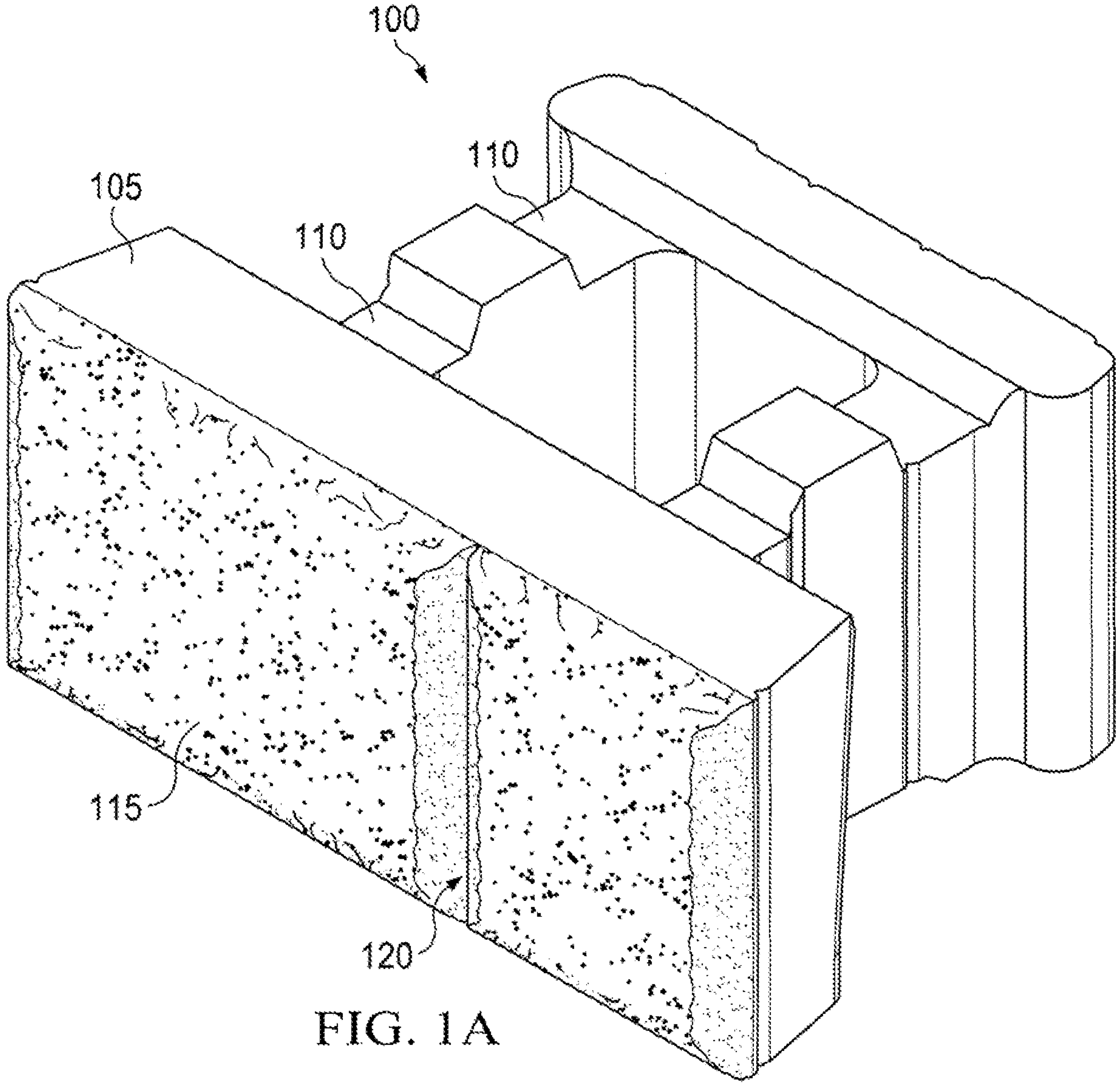
FIGS. 1A through 1C are diagrams of a retaining wall block in accordance with in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

Figure 1B:
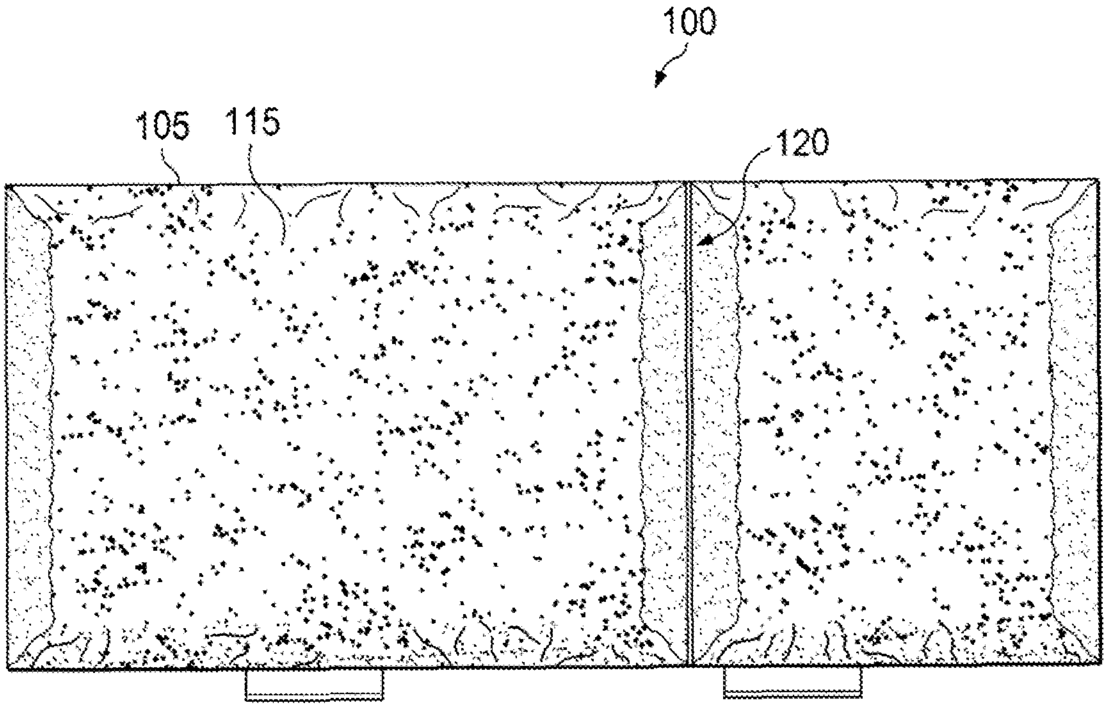
Figure 1C:
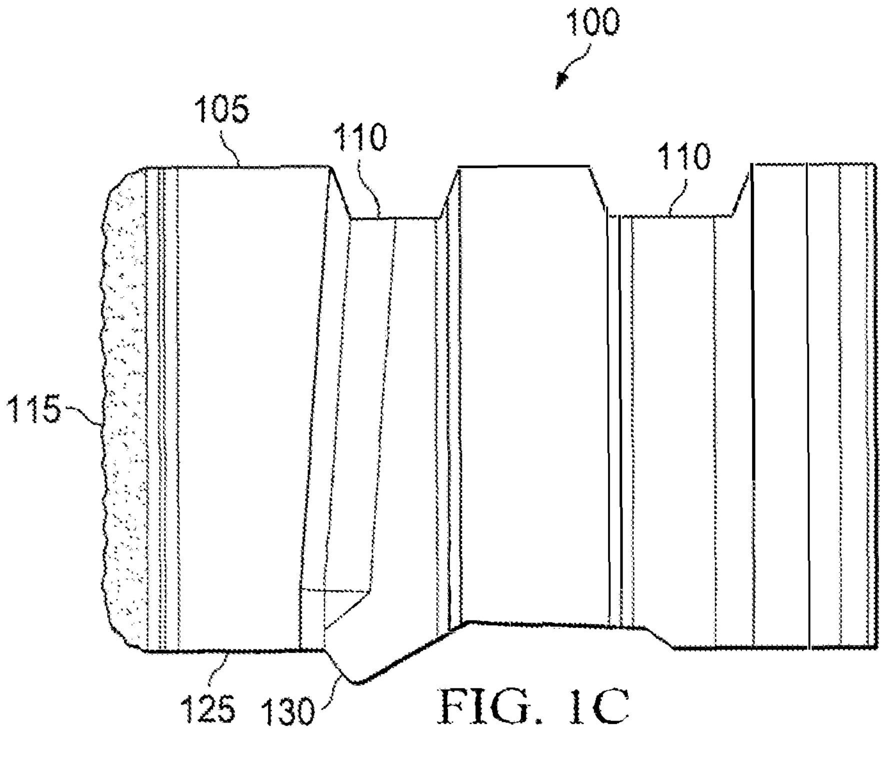

FIGS. 1A through 1C are diagrams of a retaining wall block 100 in accordance with an exemplary embodiment of the present disclosure. Retaining wall block 100 can be formed from masonry, concrete or other suitable materials, using a wet cast process, a dry cast process or other suitable processes. As shown in FIG. 1A, retaining wall block 100 includes a top face 105, engagement cavity 110, and textured front face 115. Textured front face 115 can be formed by splitting retaining wall block 100 from a second retaining wall block 200, as discussed in greater detail below. As shown in FIG. 1B, which is a front view of retaining wall block 100, front face 115 includes a false joint 120 for aesthetic purposes.

As shown in FIG. 1C, which is a side view of retaining wall block 100, retaining wall block 100 further includes bottom surface 125 having at least one engagement protrusion 130. Engagement protrusion 130 is configured to interface with engagement cavity 110 of an underlying retaining wall block 100. Furthermore, the front engagement cavity 110 is offset from the location of engagement protrusion 130, so as to result in a staggered incline as successive rows of retaining wall blocks 100 are formed. In one embodiment of the present disclosure, the incline of successive rows of retaining wall blocks 100 is generally vertical with no staggering.

Figure 2A:
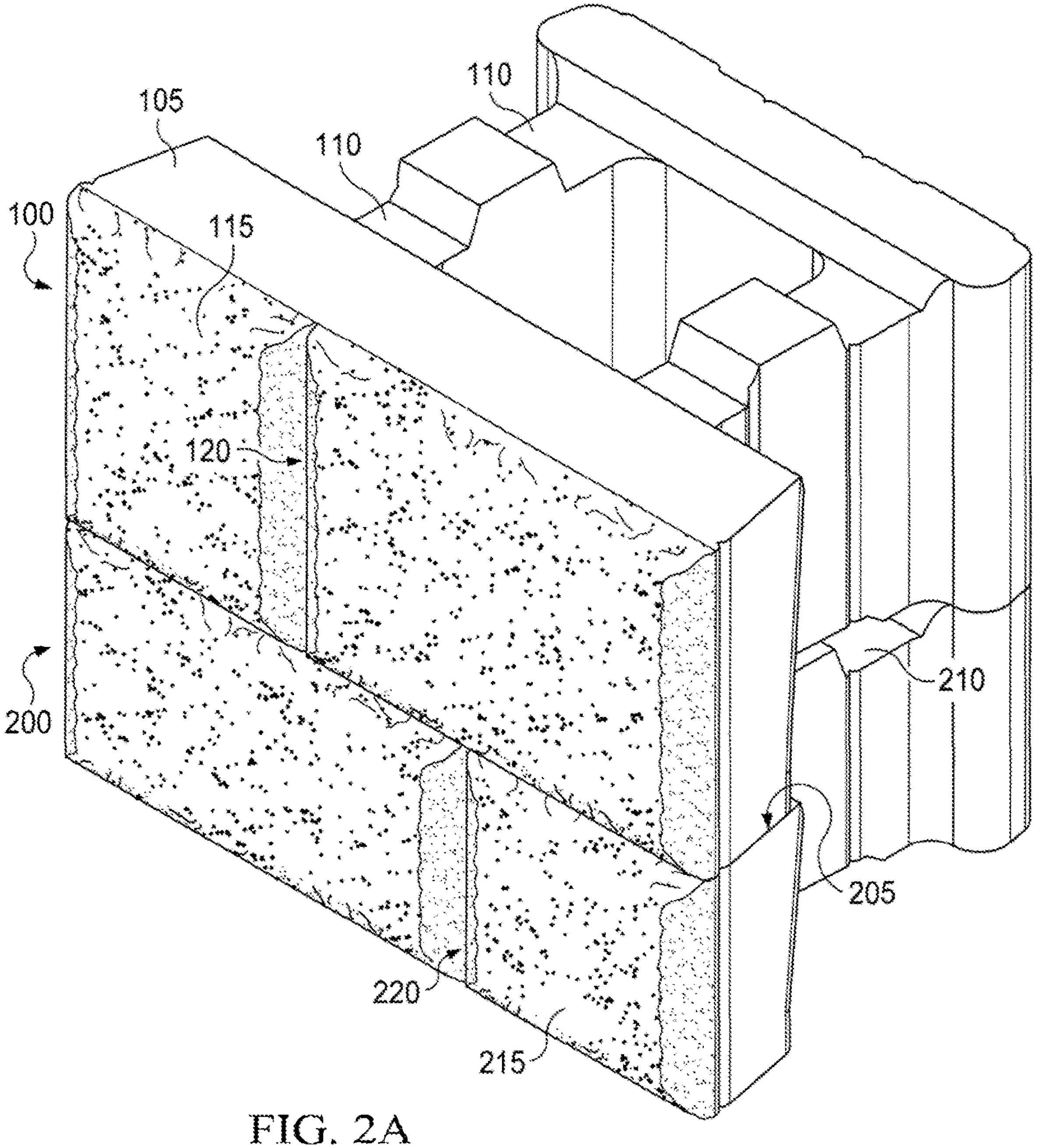
FIGS. 2A through 2C are diagrams of retaining wall blocks in accordance with in accordance with an exemplary embodiment of the present disclosure.
Figure 2B:
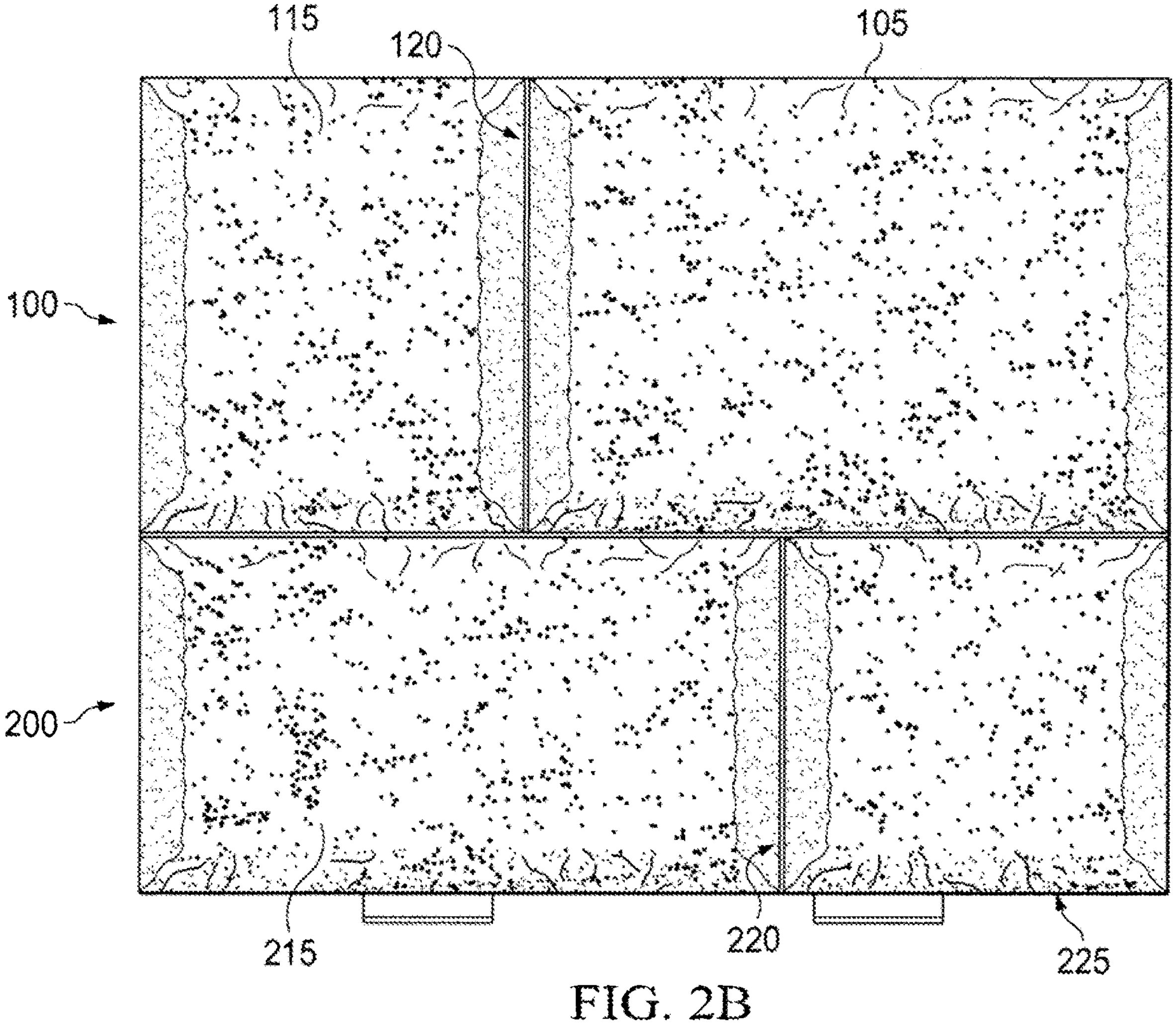
Figure 2C:
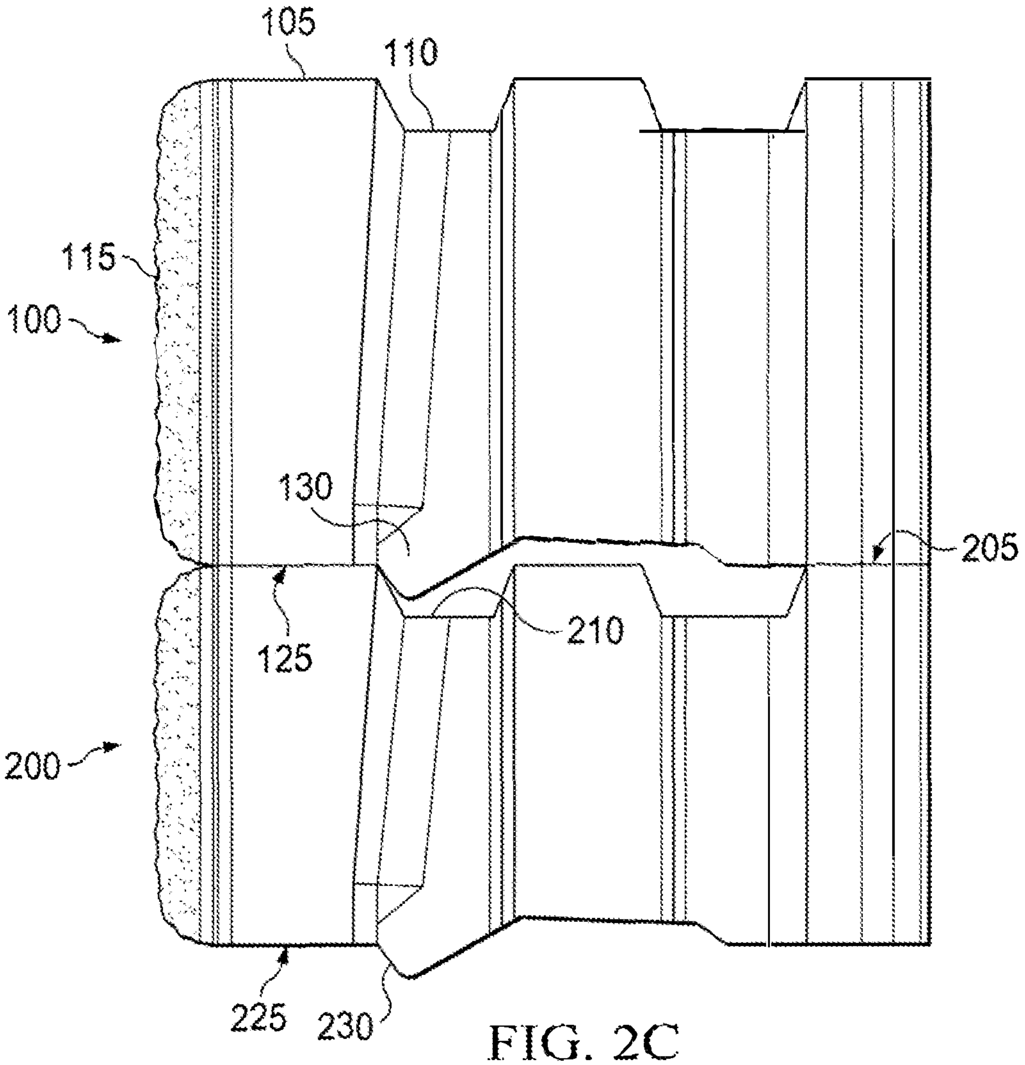

FIGS. 2A through 2C are diagrams of two engaged retaining wall blocks 100 and 200, in accordance with an exemplary embodiment of the present disclosure. As shown in FIG. 2A, retaining wall blocks 100 and 200 include top faces 105 and 205, respectively, engagement cavities 110 and 210, respectively, and textured front faces 115 and 215, respectively. As previously discussed, retaining wall blocks 100 and 200 can also have false joints 120 and 220, respectively, for aesthetic purposes, as shown in FIG. 2B. Likewise, other suitable false joints can also or alternatively be used.

In one embodiment of the present disclosure, first retaining wall block 100 is disposed onto a top surface 205 of a second retaining wall block 200. As shown in FIG. 2C, first retaining wall block 100 can be positioned so that engagement protrusions 130 align with and fit into engagement cavity 210 of second retaining wall block 200.

In one embodiment of the present disclosure, the angle and configuration of engagement notches 110 and 210 and engagement members 130 and 230 can be varied to allow the blocks 100, 200 to be assembled with an offset. In one exemplary embodiment of the present disclosure, the angle of engagement notches 110 and 210 can be between about 30 degrees and about 90 degrees. Likewise, the angle of engagement members 130 and 230 can be between about 30 degrees and about 90 degrees.

Figure 3A:
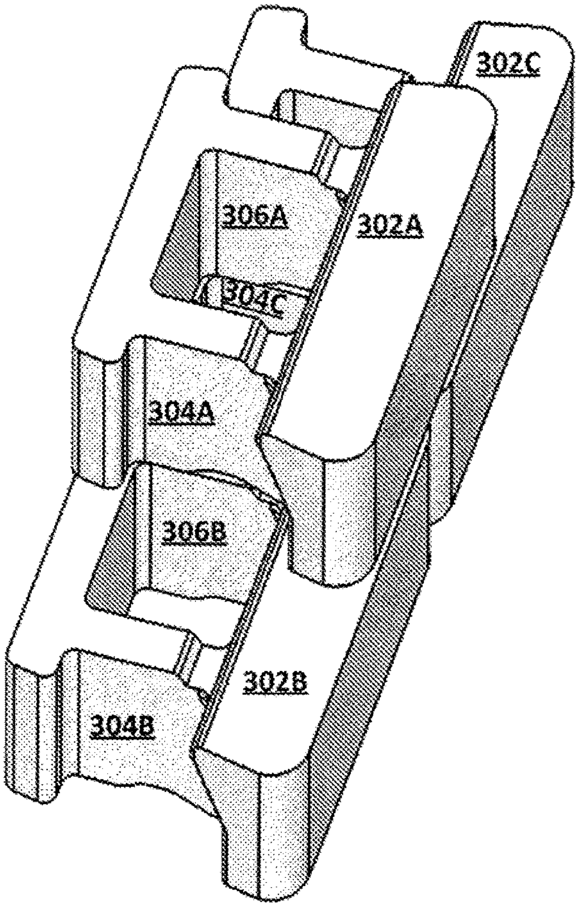
FIGS. 3A through 3B are diagrams of retaining wall blocks in accordance with in accordance with an exemplary embodiment of the present disclosure.
Figure 3B:
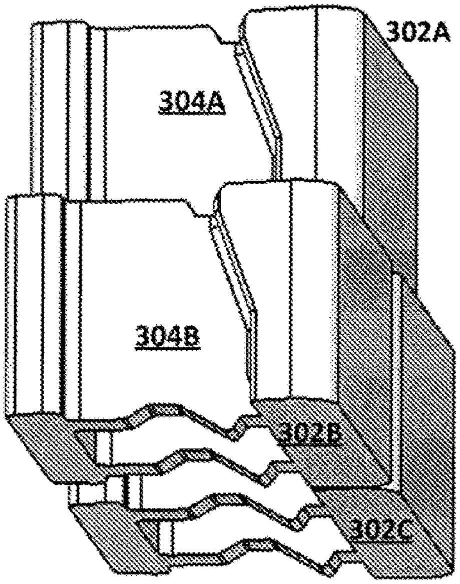

FIGS. 3A and 3B are diagrams of retaining wall blocks 302A, 302B and 302C, in accordance with an exemplary embodiment of the present disclosure. FIG. 3A shows an overhead view of retaining wall blocks 302A, 302B and 302C, with block 302A centered over blocks 302B and 302C. In addition, internal support 304A of block 302A is aligned with internal support 306B of block 302B, and internal support 306A of block 302A is aligned with internal support 304C of block 302C.

FIG. 3B shows an underside view of retaining wall blocks 302A, 302B and 302C. As can be seen, the blocks are H-shaped, and each include engagement cavities on a top surface and engagement protrusions on a bottom surface that can interlock with the engagement cavities at the top of underlying blocks. The location of the engagement cavities and engagement protrusions is adjustable, as previously described, so as to allow the angle of incline for the wall to be selected.

Figure 4A:
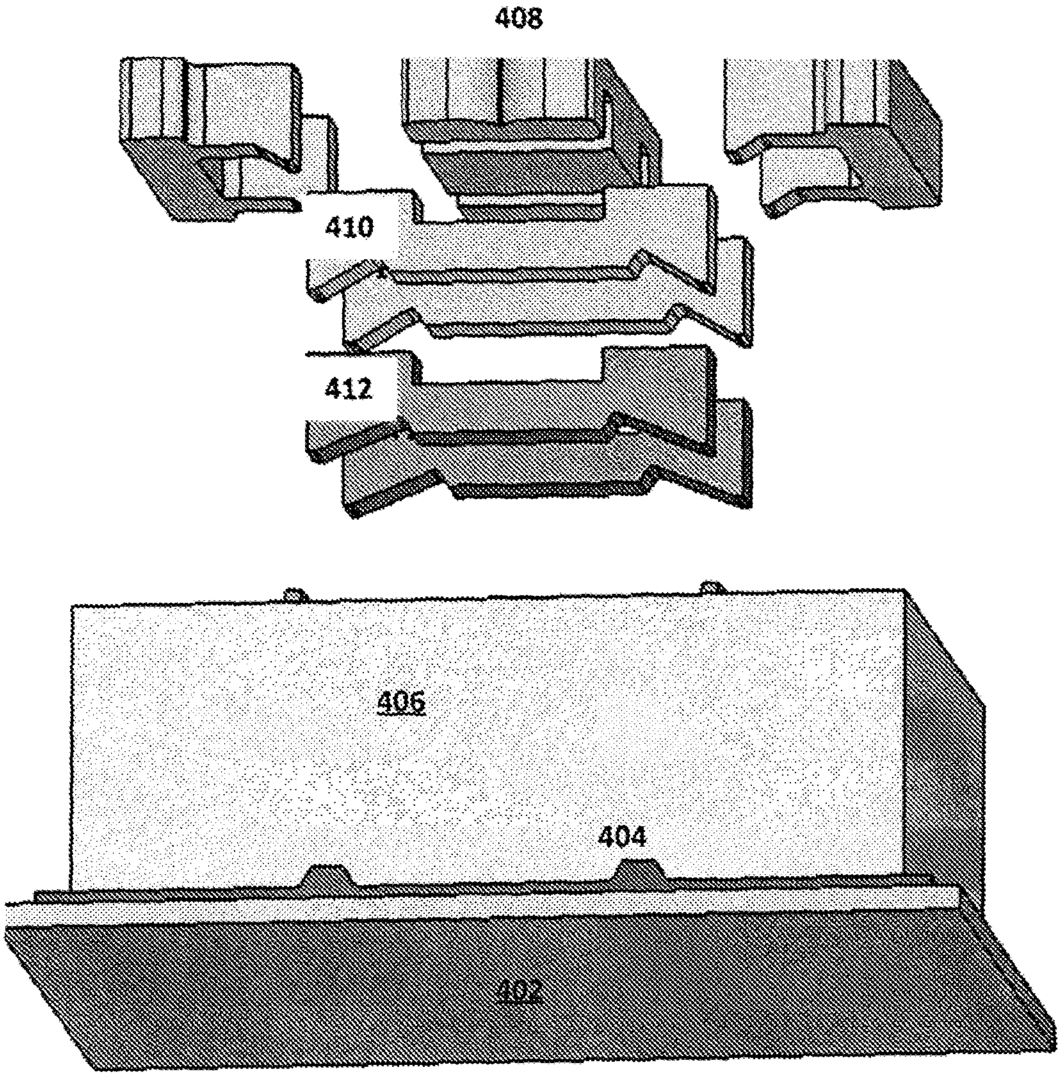
FIGS. 4A through 4B are diagrams of a mold shoe in accordance with an exemplary embodiment of the present disclosure.
Figure 4B:
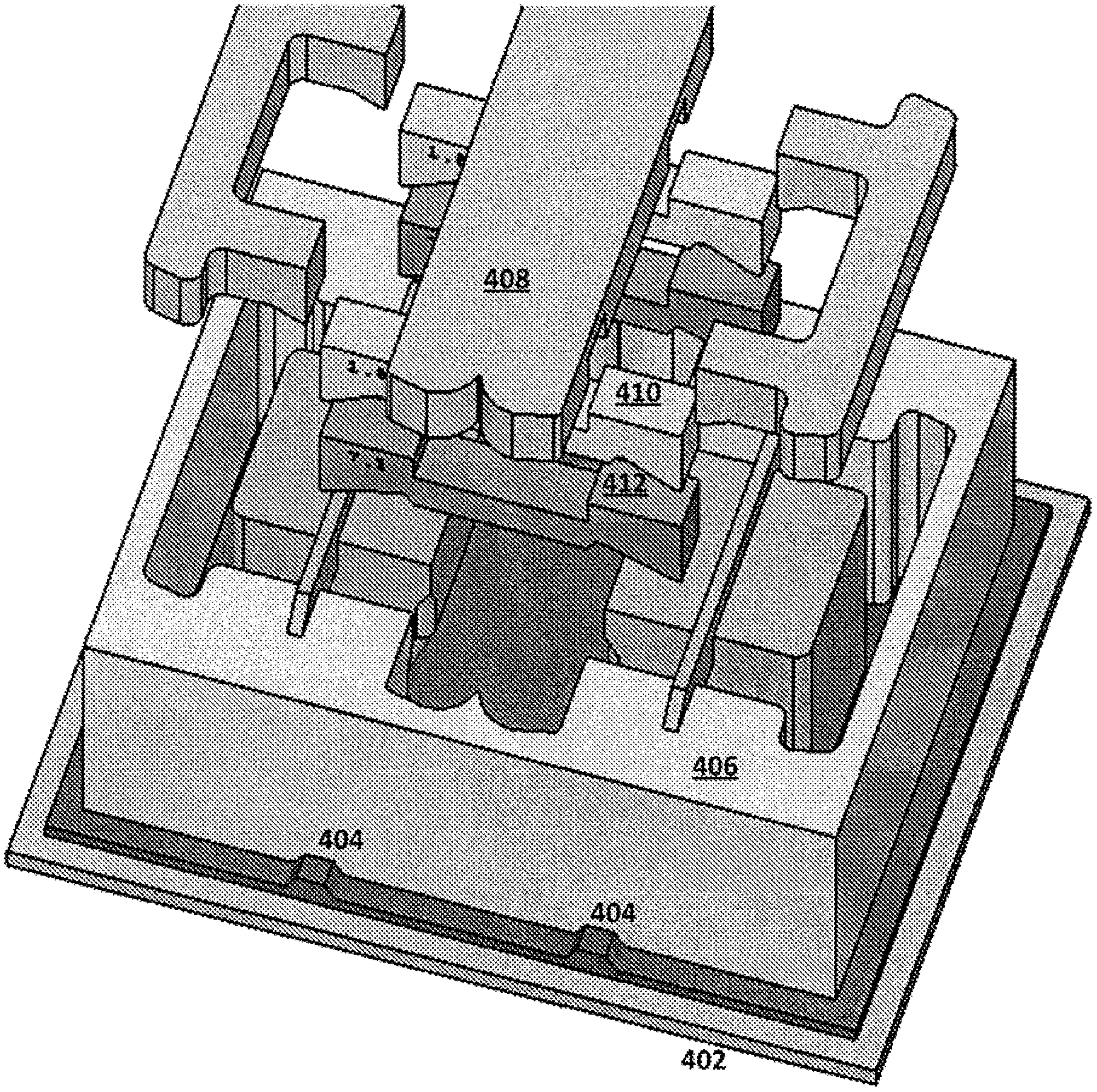

FIG. 4A through 4B are diagrams 400A and 400B of a mold for manufacturing retaining wall blocks, in accordance with an exemplary embodiment of the present disclosure. The mold can be formed from steel or other suitable materials, and can be configured to handle masonry, cement or other suitable materials.

As shown in FIGS. 4A through 4B, the mold includes a base portion 402 having a ridge 404, which is used to form the notch at the top of the block. The body 406 of the mold is placed on top of the base portion, and a shoe 408 with adjustable inserts 410 and 412 are provided that can be used to create blocks with different angles of incline, such as to allow a wall designer to specify an angle of incline. Inserts 410 and 412 interlock with shoe 408, such as by using a mechanical interlock device, screws or in other suitable manners.

Figure 5:
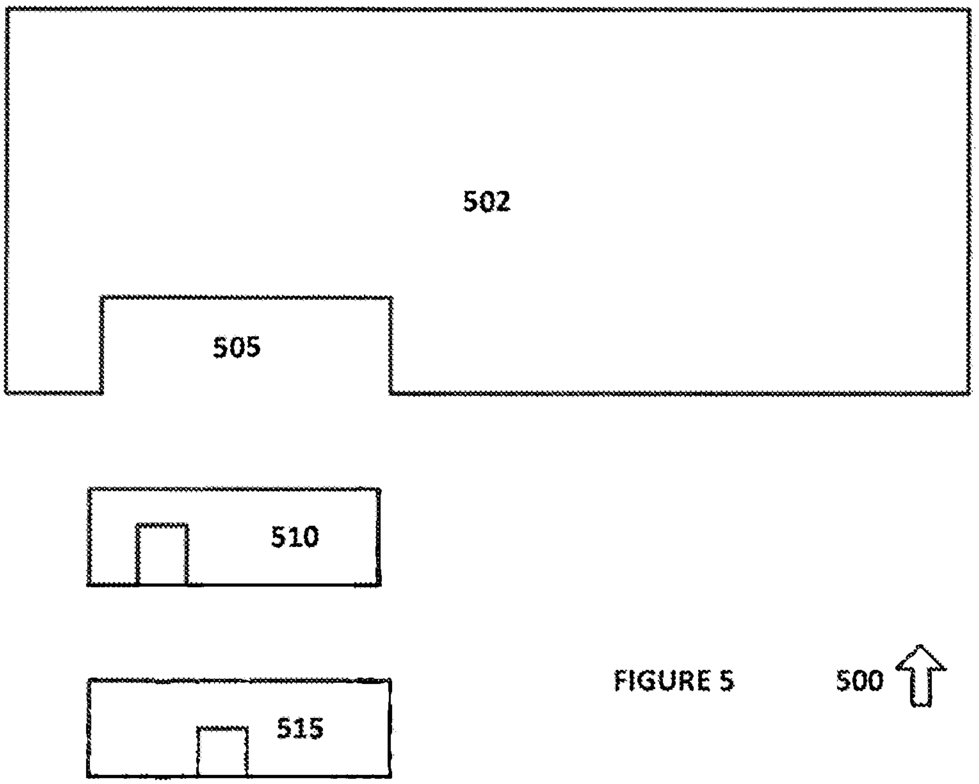
FIG. 5 is a diagram of a mold shoe in accordance with an exemplary embodiment of the present disclosure.

FIG. 5 is a diagram of a mold shoe 500 in accordance with an exemplary embodiment of the present disclosure. Mold shoe 500 includes body 502 and insert channel 505 that can be used to change the location of the at least one engagement protrusion. For example, by using insert A 510, the location of the at least one engagement protrusion is farther back than when using insert B 515. The location of the at least one engagement protrusion defines the incline of the wall, such as to allow the incline to be adjusted based on design specifications.

Figure 6:
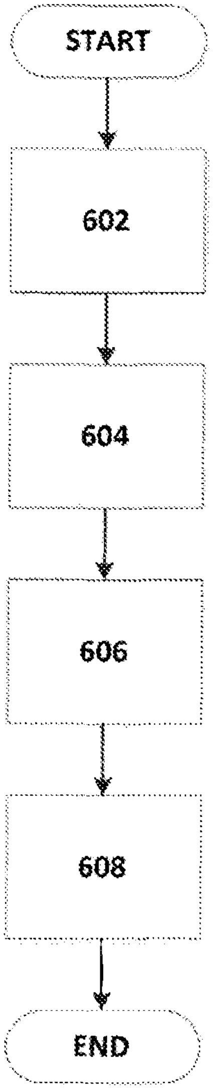
FIG. 6 is a flow chart of a method for manufacturing a retaining wall with an adjustable incline angle, in accordance with an exemplary embodiment of the present disclosure.

FIG. 6 is a flow chart of a method for manufacturing a retaining wall with an adjustable incline angle, in accordance with an exemplary embodiment of the present disclosure. Method 600 begins at 602, where an inset associated with a selected angle of incline is selected and incorporated into a mold. In one exemplary embodiment, the inset can be configured to interlock with a shoe of a mold assembly, such as by using a mechanical interlock, can be secured using screws or can otherwise be attached to the mold assembly. The method then proceeds to 604.

At 604, the mold is filled with masonry, cement or other suitable materials.

At 606, the shoe is used to compress the material into the mold and the shoe and mold is then removed.

At 608, the material is allowed to harden.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A concrete block comprising:

two transverse members connecting a front portion to a rear portion and forming a core therebetween;

an integrally-formed engagement protrusion located on a bottom surface of one of the transverse members and extending below the bottom surface of the front member;

two integrally formed cavities located on a top surface of the one of the transverse members; and wherein the transverse members are spaced apart from each other and the rear portion has a width between sides of the concrete block that is less than a width between sides of the concrete block of the front portion.

2. The concrete block of claim 1, wherein sides of the integrally-formed engagement protrusions are coplanar with the sides of the one of the transverse members.

3. The concrete block of claim 1, wherein at least one side of the integrally-formed engagement protrusion is coplanar with at least one side of the transverse member.

4. The concrete block of claim 1 wherein the transverse members are spaced such that stacking multiple courses of the concrete blocks causes the transverse members of the multiple courses to superpose each other.

5. The concrete block of claim 1 wherein the transverse members are spaced such that stacking two or more courses of the concrete blocks in an overlap running bond causes the transverse members of at least one block in each course to superpose the transverse members of two blocks in an adjacent course.

6. The concrete block of claim 1, further comprising a plurality of integrally-formed engagement protrusions.

7. The concrete block of claim 1 further comprising a plurality of integrally-formed engagement protrusions, wherein sides of each of the integrally-formed engagement protrusions are coplanar with at least one side of an associated one of the transverse members.

8. The concrete block of claim 1 further comprising a plurality of integrally-formed engagement protrusions, wherein one side of one of the integrally-formed engagement protrusions is parallel with one side of an adjacent integrally-formed engagement protrusion.

9. The concrete block of claim 1 further comprising a plurality of integrally-formed engagement protrusions, wherein sides of the integrally-formed engagement protrusion are at least partially parallel with each other.

10. A wall comprising:

a plurality of concrete blocks, each concrete block including:

two transverse members connecting a front portion to a rear portion and forming a core therebetween;

an integrally-formed engagement protrusion located on a bottom surface of one of the transverse members and extending below the bottom surface of the front member;

two integrally formed cavities located on a top surface of the one of the transverse members; and wherein the transverse members are spaced apart from each other and the rear portion has a width between sides of the concrete block that is less than a width between sides of the concrete block of the front portion.

11. The wall of claim 10, wherein sides of the integrally-formed engagement protrusions are coplanar with the sides of the one of the transverse members.

12. The wall of claim 10, wherein at least one side of the integrally-formed engagement protrusion is coplanar with at least one side of the transverse member.

13. The wall of claim 10 wherein the transverse members are spaced such that stacking multiple courses of the concrete blocks causes the transverse members of the multiple courses to superpose each other.

14. The wall of claim 10 wherein the transverse members are spaced such that stacking two or more courses of the concrete blocks in an overlap running bond causes the transverse members of at least one block in each course to superpose the transverse members of two blocks in an adjacent course.

15. The wall of claim 10, further comprising a plurality of integrally-formed engagement protrusions.

16. The wall of claim 10 further comprising a plurality of integrally-formed engagement protrusions, wherein sides of each of the integrally-formed engagement protrusions are coplanar with at least one side of an associated one of the transverse members.

17. The wall of claim 10 further comprising a plurality of integrally-formed engagement protrusions, wherein one side of one of the integrally-formed engagement protrusions is parallel with one side of an adjacent integrally-formed engagement protrusion.

18. The wall of claim 10 further comprising a plurality of integrally-formed engagement protrusions, wherein sides of the integrally-formed engagement protrusion are at least partially parallel with each other.

19. A concrete block comprising:

one or more transverse members connecting a front portion to a rear portion;

a core between the front portion and the rear portion;

an integrally-formed engagement protrusion located on a bottom surface of the transverse member and extending below the bottom surface of the front member;

two integrally formed cavities located on a top surface of the transverse member; and wherein the rear portion has a width between sides of the concrete block that is less than a width between sides of the concrete block of the front portion.

20. The concrete block of claim 19 wherein sides of the integrally-formed engagement protrusions are coplanar with the sides of the one of the transverse members.

* * * * *